United States Patent [19]
Preti et al.

[11] Patent Number: 6,114,461
[45] Date of Patent: *Sep. 5, 2000

[54] PROCESS FOR THE PREPARATION OF VINYLAROMATIC COPOLYMERS REINFORCED WITH RUBBER

[75] Inventors: Davide Preti, Revere; Anna Grazia Rossi, Mantova; Roberto Nocci, Virgilio; Nicola Vecchini, Nogara, all of Italy

[73] Assignee: Enichem S.p.A., Milan, Italy

[*] Notice: This patent issued on a continued prosecution application filed under 37 CFR 1.53(d), and is subject to the twenty year patent term provisions of 35 U.S.C. 154(a)(2).

[21] Appl. No.: 08/805,077

[22] Filed: Feb. 21, 1997

Related U.S. Application Data

[63] Continuation of application No. 08/600,002, Feb. 14, 1996, abandoned.

[30] Foreign Application Priority Data

Feb. 16, 1995 [IT] Italy ................ MI95A0280

[51] Int. Cl.⁷ ............ C08F 255/00; C08F 255/08; C08F 255/02
[52] U.S. Cl. ............ 525/298; 525/299; 525/301; 525/310; 525/321; 525/316
[58] Field of Search ........................ 525/316, 298, 525/299, 301, 310, 321

[56] References Cited

U.S. PATENT DOCUMENTS

| | | | |
|---|---|---|---|
| 3,538,190 | 11/1970 | Meredith | 525/288 X |
| 3,904,709 | 9/1975 | Morimoto | 525/316 |
| 4,145,378 | 3/1979 | Arrighetti et al. | |
| 4,975,486 | 12/1990 | Kasahara et al. | |

FOREIGN PATENT DOCUMENTS

3137418 A1  3/1983  Germany .

OTHER PUBLICATIONS

Sun et al., CAS 115:9986 (1990).

*Primary Examiner*—Jeffrey C. Mullis
*Attorney, Agent, or Firm*—Arent Fox Kintner Plotkin Kahn

[57] ABSTRACT

Process for the preparation of vinylaromatic copolymers reinforced with rubber which comprises:
a) dissolving a dienic rubber (i) and/or a linear block elastomer, vinylaromatic monomer-1,3 conjugated diene (ii), in a mixture comprising at least one vinylaromatic monomer and a pair of solvents consisting of a polar solvent and a nonpolar solvent;
b) polymerizing the solution thus obtained, possibly in the presence of an initiator.

8 Claims, No Drawings

PROCESS FOR THE PREPARATION OF VINYLAROMATIC COPOLYMERS REINFORCED WITH RUBBER

This application is a continuation application of U.S. Ser. No. 08/600,002 filed Feb. 14, 1996 now abandoned.

The present invention relates to a process for the preparation of vinylaromatic copolymers reinforced with rubber having an excellent balance of physico-mechanical properties and a high gloss, and the copolymers thus obtained.

More specifically, the present invention relates to a continuous process in mass-solution for the preparation of vinylaromatic copolymers reinforced with a dienic rubber having excellent physico-mechanical characteristics, such as shock-resistance, elastic modulus, yield point and ultimate tensile strength, combined with a high gloss, and the copolymers thus obtained.

Vinylaromatic copolymers reinforced with rubber, in particular dienic rubber, represent a well-known group of commercially known engineering polymers which are widely described in literature. Specific examples of these copolymers are, for example:

styrene/acrylonitrile copolymers containing particles of rubber, such as polybutadiene, dispersed in the polymeric matrix, generally known as ABS resins; and impact resistant polystyrene, generally known as HIPS, comprising a continuous phase of polystyrene in which particles of rubber, for example polybutadiene, are dispersed.

These vinylaromatic copolymers reinforced with rubber can be prepared by various polymerization processes, which can be continuous or batch, in emulsion, in mass, in solution or with a combined mass/suspension process.

The polymerization process in mass and in continuous is known and described, for example, in U.S. Pat. Nos. 2,694,692, 3,243,481 and 3,658,946 and in the published European patent application 400,479.

This process consists in dissolving the rubber material in the vinylaromatic monomer or in the mixture of monomers, possibly adding a radicalic polymerization initiator and an inert diluent and then polymerizing the resulting solution. Immediately after the beginning of the polymerization reaction, the solution of the rubber material in the monomer (or mixture of monomers) is separated into two phases, of which a first phase, consisting of a solution of the rubber in the monomer, initially forms the continuous phase, whereas the second phase, consisting of a solution of the resulting copolymer in the monomer, remains dispersed in the form of drops in this phase. As the polymerization and consequently the conversion proceed, the quantity of the second phase increases at the expense of the first. As soon as the volume of the second phase is equal to that of the first, there is a change in phase, commonly called phase inversion.

When this phase inversion takes place, drops of rubber solution are formed in the polymer solution. These drops of rubber solution in turn englobe small drops of what has now become the continuous polymeric phase. During the process, there is also a grafting of the rubber on the part of the polymer chain.

The polymerization is generally carried out in several steps. In the first polymerization step, called prepolymerization, the solution of rubber in the monomer or mixture of monomers is polymerized until a conversion is reached which allows the phase inversion. The polymerization is subsequently continued until the desired conversion.

Polymerization in mass-solution enables the production of vinylaromatic copolymers reinforced with rubber having a good balance of physico-mechanical properties and a high gloss. It is not possible however, at least in the case of ABS copolymers, to reach the values which are typical of products obtained with a synthesis process in emulsion.

For example, as it is well known to experts in the art, if attempts are made to increase the content of rubber in the formulation to increase the shock-resistance of the product, the reaction mass becomes very viscous and difficult to stir, as the polymerization proceeds. In this way the thermal exchange can be greatly reduced or even prevented, with serious problems relating to the safety of the operations. In addition, even when this can be obviated, the devolatilization process of this highly viscous mass requires longer residence times and/or higher temperatures, with the consequent activation of decomposition processes of the matrix or cross-linking of the rubber. Finally, as the dimension of the particles cannot be regulated without efficient stirring, the properties themselves of the product are jeopardized.

A possible solution could lie in the use of linear polybutadiene rubbers with a low molecular weight and, consequently, reduced viscosity in solution. These rubbers however have the known disadvantage of the cold flow which greatly limits the possibility of their storage and transport.

U.S. Pat. No. 4,421,895 describes the use of a dienic rubber having a viscosity in solution which is equal to or lower than 80 mPa*s, when measured in solution at 5% by weight in styrene at 25° C., in the production of ABS. In particular, the diene rubber proposed by this patent is a linear styrene-butadiene block polymer. This type of block rubber has the advantage of not having the "cold flow" phenomenum and of favouring the formation of fine particles. In fact, ABS with particles having dimensions of less than 0.7 micrometres is obtained using this type of linear block rubber and operating with the method described in this patent. The improvement in surface gloss obtained using the above linear block polymer, occurs to the detriment of the other physico-mechanical characteristics and in particular the shock-resistance. The ABS obtained does not, therefore, have the desired combination of properties.

It is also known in literature that vinylaromatic copolymers reinforced with rubber having a high shock resistance and surface gloss can be prepared using a polymer with a radial or star structure as rubber. The use of these particular rubber polymers in the production of vinylaromatic copolymers reinforced with rubber is described, for example, in U.S. Pat. Nos. 4,587,294 and 4,639,494, in the published European patent application 277,687 and in the published Japanese patent applications 59-232,140 and 59-179,611.

Rubbers with a radial or star structure are produced with well-known techniques firstly forming a linear polymer with active chain-ends, and subsequently adding a coupling agent such as, for example, silicon tetrachloride, capable of reacting with these chain-ends and binding several polymeric chains to the silicon atom, as described, for example in U.S. Pat. Nos. 4,183,877, 4,340,690, 4,340,691, 4,403,074, 4,221,884, 3,688,162, etc.

The above rubbers allow the production, with respect to other known dienic-based rubbers, of copolymers with an improved gloss and the same physico-mechanical characteristics. Also in this case, however, the ABS obtained cannot be considered as equivalent to the products coming from emulsion. For example, in European patent application 277,687, a sample with an Izod resilience of 350 J/m corresponds to a gloss of 60%. In ABS from emulsion with analogous resilience values, the gloss is generally higher than 90%.

It is also known that, in ABS, the balance of mechanical/gloss properties can be significantly improved by resorting to a bimodal distribution of the rubber particles. These materials can also be easily obtained by polymerization in emulsion. The final product, with the desired ratio between large and fine particles, can in turn be obtained by mixing the single end products in an extruder or, preferably, in the coagulation phase of the latex. The techniques for obtaining these materials and the main correlations between physico-mechanical properties and structure are well known to experts in the field and are widely described, for example, in:

"Encyclopedia of Polymer Science and Engineering", J. Wiley & Sons, 1985, vol. 1, page 388;

"Rubber Toughened Plastics", C. Keith Riew Editor, American Chemical Society, Washington, 1989 and in the bibliographical references mentioned herein.

The published European patent application 412,801 describes a process for the preparation in mass-solution and in continuous of copolymers reinforced with rubber (HIPS and ABS) having a bimodal distribution of the particles. According to the disclosures, two prepolymers are separately formed in two parallel plug-flow type reactors until a conversion of between 10 and 50% of the initial monomers. The first prepolymer contains rubber particles with dimensions of between 0.05 and 1.5 micrometres, the second prepolymer contains rubber particles with dimensions of between 0.7 and 10 micrometres. The two prepolymers are extracted in continuous from the respective reactors, mixed in a suitable proportion and the polymerization is carried out in two or more reactors arranged in series until the desired conversion is reached (65-80%). The solvent and non-converted monomers are subsequently removed by devolatilization.

The proportion between the two streams of prepolymer must be such that the rubber particles deriving from the first prepolymer consist of between 50 and 95% by weight of the rubber content of the end product. This process is particularly advantageous for the preparation of HIPS with small particles of between 0.2 and 0.7 micrometres and large particles of between 1.5 and 5 micrometres and ABS with small particles of between 0.5 and 0.8 micrometres and large particles of between 1 and 3 micrometres. The polymers thus prepared are presented as having a balance of mechanical/gloss properties which is higher than that of products obtained by the mechanical mixing of the single components in an extruder.

The rubber recommended for ABS is linear polybutadiene with a high viscosity.

The maximum resilience value however which is obtained for ABS is equal to 128 J/m with a rubber content of 7.4%.

In addition, with the procedure of these disclosures, it is necessary to introduce at least one extra polymerization reactor with respect to the traditional plant for ABS. Process controls are also necessary of both the morphologies formed and above all of the mixing phase of the two prepolymers. Any form of productive inefficiency in this section of the plant can irreparably jeopardize the quality of the product.

The Applicant has now found that it is possible to produce vinylaromatic copolymers reinforced with rubber having a high gloss and mechanical properties, using as rubber material (i) a dienic rubber or (ii) a linear block copolymer based on a vinylaromatic monomer and a 1,3 conjugated diene, wherein said block copolymer has a diene content which is greater than 70% by weight and, respectively, a content of vinylaromatic monomer which is less than 30% by weight, and carrying out the polymerization, instead of in a single solvent, in a mixture consisting of a nonpolar solvent, such as an aromatic hydrocarbon, and a polar solvent, for example a ketone, an ester, an ether, a nitrile, etc. The polymerization can be carried out in a conventional polymerization plant for HIPS or ABS in mass-solution and in continuous, consisting of two or more reactors of the plug-flow type, arranged in series, and one or more devolatizers, as described in the above-mentioned U.S. Pat. Nos. 2,694, 692, 3,243,481 and 3,658,946 or in the published European patent application 400,479.

The present invention, therefore, relates to a process for the preparation of vinylaromatic copolymers reinforced with rubber which comprises:

a) dissolving a dienic rubber (i) and/or a linear block elastomer, 1,3 conjugated vinylaromaticdiene monomer (ii), in a mixture comprising at least one vinylaromatic monomer and a pair of solvents consisting of a polar solvent and a nonpolar solvent;

b) polymerizing the solution thus obtained, possibly in the presence of an initiator.

The dienic rubber (i) used in the process of the present invention can be natural or synthetic. Synthetic diene rubbers which are particularly suitable are those consisting of a polymer of a 1,3 conjugated diene containing from 4 to 6 carbon atoms. Examples of these rubbers are polybutadiene, polyisoprene, copolymers of butadiene and/or isoprene with styrene or with other monomers containing more than 50% by weight of butadiene or isoprene, etc.

Diene rubber which is particularly preferred is polybutadiene having:

a Mooney viscosity of between 20 and 70, preferably between 25 and 65 ML 1+4 at 100° C., measured according to regulation ASTM D 1646-80;

a viscosity in solution of between 20 and 200 cps, preferably between 20 and 140 cps, measured in its solution at 5% by weight in styrene at 25° C.;

a content of 1,2 vinyl of between 5 and 35, preferably between 7 and 18% by weight; and a content of 1,4-cis of more than 20% by weight, preferably between 25 and 45%.

This type of polybutadiene can be prepared by polymerization techniques in solution in the presence of lithiumalkyl as catalysts, as described in "Encyclopedia of Polymer Science and Engineering", J. Wiley & Sons, 1985, Vol.2, page 537.

The polybutadiene can have a linear, branched or star structure. The latter structure can be easily obtained using a conventional polymerization initiator and, at the end of the polymerization, a polyfunctional coupling agent, or using a polyfunctional polymerization initiator. Methods for preparing a star polybutadiene with a polyfunctional coupling agent are known and illustrated in U.S. Pat. Nos. 4,183,877, 4,340,690, 4,340,691 or in the published Japanese patent application 59/24,711.

Methods for preparing a star polybutadiene with a polyfunctional initiator are illustrated, for example, in U.S. Pat. Nos. 4,182,818, 4,624,749, 3,668,263 and 3,785,510.

Polybutadienes having the above properties are available on the market under various trade-names, for example INTENE of EniChem Elastomeri S.p.A., BUNA CB of Bayer, etc.

The linear block elastomers (ii) can be represented by one of the following general formulae (I), (II) and (III):

(I)=S–B;

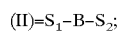
(II)=S$_1$–B–S$_2$;

and

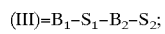
(III)=B$_1$–S$_1$–B$_2$–S$_2$;

wherein S, S$_1$ and S$_2$ are non-elastomeric polymeric blocks of a vinylaromatic monomer having the same or different molecular weight whereas B, B$_1$ and B$_2$ are elastomeric polymeric blocks based on a conjugated diene having the same or different molecular weight.

In these linear elastomers or block copolymers, the non-elastomeric polymeric blocks have a molecular weight of between 5,000 and 50,000 and the elastomeric ones a molecular weight of between 2,000 and 250,000. Between the polymeric blocks S, S$_1$, S$_2$ and B, B$_1$, B$_2$, there may be "random" and/or "tapered" segments. In the "tapered" segment the passage between the B, $B_1$ and $B_2$ blocks and the S, $S_1$ and $S_2$ blocks can be gradual, in the sense that the proportion of vinylaromatic monomer in the diene polymer progressively increases in the direction of the non-elastomeric polymeric block, whereas in the same way the proportion of conjugated diene progressively decreases. In the "random" segment the vinylaromatic monomers and conjugated diene are statistically arranged. The molecular weights of the "random" and/or "tapered" segments are preferably between 500 and 15,000.

These linear block copolymers can be prepared with techniques which are well known to experts in the field such as, for example, by first forming a vinylaromatic polymer block, by means of anionic polymerization, in an inert solvent and in the presence of an organometallic catalyst (initiator) based on lithium, subsequently forming the polymer block of conjugated diene by the addition of this monomer and, possibly, forming another vinylaromatic polymer block by the addition of the corresponding monomer. Techniques for the preparation of block copolymers (ii) are described, for example, in U.S. Pat. No. 3,265,765.

Further details on the physical and structural characteristics of these block elastomers are provided in B.C. Allport, "Block Copolymers" Applied Science Publishers Ltd., 1973.

Particularly preferred block copolymers (ii) of the present invention are those having a viscosity in solution of not less than 10 cps, measured in solution at 5% by weight in styrene at 25° C., preferably between 20 and 90 cps, and a styrene content of not more than 30% by weight. The block copolymers used in the present invention are also available on the market under the trade-names of STEREON 721A of Firestone, or NIPOL NS 324 S of Nippon Zeon.

The conjugated dienes which can be used for the preparation of the linear block copolymers (ii) are those having from 4 to 8 carbon atoms in the molecule such as, for example, 1,3-butadiene, isoprene, 2,3-dimethyl-1,3-butadiene, piperylene, etc, or their mixtures. 1,3-butadiene is particularly preferred.

If desired, it is also possible to use in the present process, as rubber component, a mixture of the diene rubber (i) and linear block copolymer (ii). In this case, the mixture can consist of from 1 to 99% by weight of dienic rubber (i), preferably from 3 to 40%, and, in correspondence with this, from 99 to 1% by weight, preferably from 97 to 60%, of linear block copolymer (ii).

The quantity of elastomeric material (i) and/or (ii) used in the process of the present invention varies from 4 to 20% by weight, preferably from 7 to 20%, with respect to the total reaction mixture.

The term vinylaromatic monomer, as used in the present invention and claims, refers to ethylenically unsaturated compounds having general formula (IV)

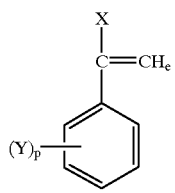

(IV)

wherein X represents hydrogen or an alkyl radical having from 1 to 4 carbon atoms; p is zero or an integer between 1 and 5; and Y represents a halogen or alkyl radical having from 1 to 4 carbon atoms.

Examples of vinylaromatic monomers having formula (IV) are: styrene, mono-, di-, tri-, tetra-, and pentachlorostyrene and the corresponding alphamethylstyrenes; styrenes alkylated in the nucleus and the corresponding alphamethylstyrenes; ortho-, meta- and paramethylstyrene; ortho- and paramethyl-alphamethylstyrene, etc. Styrene is the preferred vinylaromatic monomer.

The vinylaromatic monomers can be used alone, mixed with each other or with other copolymerizable monomers such as maleic anhydride or acrylic or methacrylic monomers.

Acrylic monomer means mainly and preferably acrylonitrile. Other acrylic or methacrylic monomers are methacrylonitrile, acrylic or methacrylic acid and their alkylesters containing from 1 to 8 carbon atoms in the alkyl radical.

The quantities of vinylaromatic monomer and copolymerizable monomer used in the process of the present invention vary in relation to the physico-mechanical properties desired in the end-product. Generally, the quantity of copolymerizable monomer varies from 5 to 45% by weight, preferably from 15 to 35%, of the total of the mixture of monomers.

The polymerization is carried out in an inert diluent consisting of a mixture of nonpolar component with a polar component. A hydrocarbon which is liquid at the polymerization temperature is preferred as nonpolar diluent, for example an aromatic hydrocarbon such as toluene, ethylbenzene xylenes or mixtures of these solvents in any ratio with each other.

Polar diluent means an organic compound which is liquid at the polymerization temperature consisting of carbon and hydrogen and containing one or more hetero-atoms such as oxygen or nitrogen, in the molecule. This compound is, in addition, of the saturated aliphatic or aromatic type and is characterized, when its molecule is not symmetrical, by a dipole moment value of more than $3 \times 10^{-30}$ C*m. Examples of polar diluents are: acetone, cyclohexanone, methylethylketone, diethylketone, acetonitrile, propionitrile, butyronitrile, ethyl acetate, butyl acetate, tetrahydrofuran, dioxane, etc. Of these, acetonitrile and acetone are preferred.

The content of polar component in the solvent mixture can vary from 1 to 95% by weight and, preferably from 3 to 50%.

The polymerization is carried out using the conventional techniques in mass solution and in continuous. According to this polymerization technique, the rubber is dissolved in the monomer, or monomers, in the presence of the pair of solvents in turn present in a quantity which can vary from 5 to 100% by weight, with respect to the total monomers plus rubber, and the resulting solution is subjected to polymerization with the possible use of an initiator. The polymerization is generally carried out in two or more vertical, tubular, stirred plug-flow reactors arranged in series. Vertical tubular reactors having a ratio length/diameter of more than 2 and, preferably of between 3 and 10 are preferred.

Each reactor is maintained at a pressure which is higher than that at which the components fed evaporate. The pressure is normally between 0.5 and 5 bars whereas the temperature is between 70 and 160° C., distributed along each reactor so as to provide two or more heated areas at different temperatures. It is preferable to obtain a polymerization conversion at the outlet of the first reactor of 20–60%, preferably 25–50%, by weight with respect to the monomers, and subsequently complete the polymerization in the other reactors. It is also preferable for the residence time of the monomers in the first area of the first reactor to be at least equal to that which is necessary for halving the concentration of the initiator at the polymerization temperature. In this way a higher content of rubber grafted to the polymeric matrix is obtained.

This latter parameter can be evaluated by the ratio between the quantity of final polymeric product insoluble (gel) in acetone, at room temperature, and the quantity of rubber charged. This ratio is called grafting ratio and in the above process can vary from 1.4 to 3.

When the desired conversion degree has been reached (65–95%), the solvents present and non-converted monomers are removed under vacuum and at a high temperature (200–260° C.) and the resulting polymer is extruded through a die, cooled and cut into granules of the desired dimensions. The gas products, removed under vacuum, are condensed and, possibly, recycled to the first reactor.

The dissolution of the rubber and initiator in the mixture monomers/solvents can be carried out in a single mixer or in two separate mixers of which the vinylaromatic monomer, the rubber and mixture of solvents are introduced into the first, maintained at a temperature of not more than 100° C., whereas the initiator, possible comonomers and, optionally, an additional aliquot of solvents are introduced into the second, which is not heated.

The initiators used are the conventional ones used in the polymerization of styrene such as, for example, organic peroxide radicalic initiators. Examples of these initiators are: dibenzoyl peroxide, ter-butyl peroctoate, ter-butylperbenzoate, di-ter-butyl peroxide, 1,1'-di-ter-butylperoxy-3,3,5-trimethylcyclohexane, etc. These initiators are added in quantities of between 0.005 and 0.5% by weight with respect to the monomers.

The copolymers reinforced with rubber obtained with the process of the present invention comprise particles of rubber having an average diameter ranging from 0.1 to 5 micrometres, preferably from 0.1 to 1.5. These particles have a typical cellular morphology with occlusions of grafted and non-grafted copolymer. The morphological structure of the materials can be indicated and measured with the usual techniques of electronic microscopy in transmission.

The copolymers of the present invention have an excellent balance of physico-mechanical properties, such as shock-resistance, at room temperature or below 0° C., elongation to break, yield point and ultimate tensile strength, tensile modulus, etc. and a high gloss. Owing to these characteristics, these copolymers are suitable for use in all high quality applications, typical of the ABS obtained with the emulsion process.

The following illustrative examples provide a better understanding of the present invention and its embodiment but do not limit its scope in any way.

In the examples, the following methods were used for determining the characteristics of the copolymers obtained:
Mechanical Properties The Izod resilience with notch was determined at 23° C. according to ASTM D256 on test samples having a thickness of 3.2 mm and 12.7 mm. The yield point, ultimate tensile strength, elongation to break and tensile modulus were measured according to ASTM D 638.
Thermal Properties The Vicat softening temperature was determined at 5 Kg in oil according to ISO 306.
Rheological Properties The Melt Flow Index (M.F.I.) was determined according to ASTM D1238, at 220° C. and 10 Kg.
Optical Properties The Gloss was determined and measured according to the method ASTM D523-80 with an angle of incidence of 60° on a sample having dimensions of 10 cm×10 cm×3 mm. The sample was injection moulded at 215° C. with a mould maintained at 35° C., having a smooth surface with a surface roughness factor of 0.02. The measurement was carried out at 3.5 cm from the side of the sample opposite to the injection point.

EXAMPLE 1 (comparative)

The following products were charged into a mixer reactor of the type CFSTR, having a volume of 1 liter:

37.2 parts by weight of styrene;
12.8 parts by weight of acrylonitrile;
40.0 parts by weight of ethylbenzene;
0.15 parts by weight of a phenolic antioxidant (IRGANOX 1076);
0.0225 parts by weight of 1,1'-di-ter-butylperoxy-3,3,5-trimethylcyclohexane;
0.04 parts by weight of ter-dodecylmercaptan;
10.0 parts by weight of a linear diblock copolymer polystyrene-polybutadiene having a content of polystyrene equal to 10% by weight and polybutadiene equal to 90% by weight; a weight average molecular weight of 135,000 measured by Gel Permeation Chromatography (GPC) using the calibration of polybutadiene (Mark-Houwink constants $K=3.9\times10^{-4}$ and $\alpha=0.713$) and a weight average molecular weight of the polystyrene block of 20,000, measured by GPC using the calibration of polystyrene (Mark-Houwink constants $K=1.5\times10^{-4}$ and $\alpha=0.7$).

The resulting mixture was fed at a temperature of about 100° C. and at a flow rate of 0.43 Kg/h to the head of a first full-type, plug-flow, vertical, tubular reactor, having a volume of 2 litres and a ratio length/diameter of 7.4.

The reactor was divided into two reaction zones, each thermostat-regulated so as to maintain the reaction mixture in accordance with the following temperature profile:
first zone: 100° C.;
second zone: 105° C.

The reactor was equipped with a stirrer consisting of 20 horizontal arms rotating at 100 rpm. The pressure of the reactor was maintained at 4 bars.

The residence time of the reaction mixture in the first zone of the first reactor was about 120 minutes whereas the total residence time was about 4 hours.

0.04 parts by weight of n-dodecylmercaptan were added to the reaction mixture discharged in continuous from the reactor and having a content of solids of about 28% by weight, and the mixture was fed to a second vertical, tubular reactor the same as the first and thermostat-regulated so as to maintain the reaction mixture in accordance with the following temperature profile:
first zone: 120° C.;
second zone: 150° C.

The residence time of the reaction mixture in the second reactor was about 4 hours.

The reaction mass leaving the second reactor had a content of solids of about 50% by weight, corresponding to a conversion of about 80% by weight.

The reaction mass was then heated to 250° C. in a preheater and the solvent and non-reacted monomers devolatilized in an evaporator under vacuum at 20 mmHg.

The copolymer discharged from the evaporator had a total content of volatiles of about 0.3% by weight and its properties are shown in table 1.

EXAMPLE 2 (comparative)

Example 1 was repeated, substituting the 10 parts by weight of diblock copolymer with 11.3 parts of a mixture consisting of polybutadiene Buna CB HX 565 and the same diblock copolymer in a weight ratio 9.5/90.5. In addition, the quantity of ethylbenzene was brought from 40 to 46.2 parts by weight.

The properties of the resulting copolymer are shown in table 1.

EXAMPLE 3 (comparative)

Example 1 was repeated substituting the 40 parts by weight of ethylbenzene with the same parts by weight of acetonitrile.

The test was interrupted after about 10 hours, once it had been ascertained that it was impossible to extrude the product through the devolatizer even at high temperatures and pressure. The reactors were opened and examined and it was verified that the rubber had been separated and partially cross-linked in the reaction medium. This result proves the impossibility of synthesizing the desired product in the presence of a polar solvent alone.

EXAMPLE 4

Example 1 was repeated substituting 5 parts by weight of ethylbenzene with the same parts by weight of acetonitrile. The properties of the resulting copolymer are shown in table 1.

EXAMPLE 5

Example 2 was repeated substituting 7.5 parts by weight of ethylbenzene with the same parts by weight of acetonitrile. The properties of the resulting copolymer are shown in table 1.

TABLE

|  | Examples | | | |
| --- | --- | --- | --- | --- |
|  | 1 | 2 | 4 | 5 |
| % rubber on end product (*) | 17.4 | 18.9 | 17.0 | 18.1 |
| Buna CB HX 565 (%) | — | 9.5 | — | 9.5 |
| Block copolymer (%) | 100 | 90.5 | 100 | 90.5 |
| Ethylbenzene (%) | 100 | 100 | 87.5 | 83.8 |
| Acetonitrile (%) | — | — | 12.5 | 16.2 |
| Product characteristics | | | | |
| MFI (g/10') | 4.4 | 6.0 | 6.0 | 4.8 |
| Vicat (° C.) | 95.0 | 93.5 | 98.0 | 94.5 |
| Elastic Modulus (MPa) | 1650 | 1520 | 1850 | 1660 |
| Yield Point (MPa) | 28.5 | 28.0 | 36.5 | 32.0 |
| Ultim. tens. strength (MPa) | 28.0 | 25.0 | 29.0 | 24.0 |
| Elongation to break (%) | 85.0 | 90.0 | 99.0 | 80.0 |
| Izod resistance (J/m) | | | | |
| Test Sample 3.2 mm | 380 | 410 | 400 | 450 |
| Test sample 12.7 mm | 270 | 300 | 300 | 330 |
| Gloss (%) [60°] | 48 | 57 | 80 | 80 |

(*) expressed as polybutadiene

What is claimed is:

1. A process for the preparation of vinylaromatic copolymers reinforced with rubber which consists of:

a) dissolving a dienic rubber polymer (i) wherein the monomers in the polymer consist of a 1,3 conjugated diene containing from 4 to 6 carbon atoms and/or a linear block elastomer consisting of a vinylaromatic monomer-1,3 conjugated diene (ii), in a mixture comprising at least one vinylaromatic monomer, an acrylic monomer and a pair of solvents consisting of a polar solvent and a nonpolar solvent; and b) polymerizing the solution thus obtained.

2. Process according to claim 1, wherein a hydrocarbon which is liquid at the polymerization temperature is used as nonpolar solvent.

3. Process according to claim 2, wherein the nonpolar solvent is selected from aromatic hydrocarbons.

4. Process according to claim 1, wherein an organic compound which is liquid at the polymerization temperature consisting of carbon and hydrogen and containing one or more heteroatoms in the molecule, is used as a solvent.

5. Process according to claim 4, wherein is of the saturated aliphatic or aromatic type and is characterized, when its molecule is not symmetrical, by a dipole moment value which is higher than $3*10^{-30}$C*m.

6. Process according to claim 1, wherein the content of a polar solvent in the mixture of solvents is between 1 and 95% by weight.

7. Process according to claim 1, wherein the pair of solvents is present in the reaction mixture in quantities of between 5 and 100% by weight, with respect to the total of monomers plus rubber.

8. Vinylaromatic copolymers reinforced with rubber obtained with a process which comprises:

a) dissolving a dienic rubber polymer (i) wherein the monomers in the polymer consist of a 1,3 conjugated diene containing from 4 to 6 carbon atoms and/or a linear block elastomer consisting of a vinylaromatic monomer-1,3 conjugated diene (ii), in a mixture comprising at least one vinylaromatic monomer, an acrylic monomer and a pair of solvents consisting of a polar solvent and a nonpolar solvent; and b) polymerizing the solution thus obtained.

* * * * *